(12) United States Patent
Basam

(10) Patent No.: US 10,198,732 B2
(45) Date of Patent: Feb. 5, 2019

(54) INTERACTIVE ERROR USER INTERFACE

(71) Applicant: eBay Inc., San Jose, CA (US)

(72) Inventor: Dileep Kumar Basam, San Jose, CA (US)

(73) Assignee: eBay Inc., San Jose, CA (US)

( * ) Notice: Subject to any disclaimer, the term of this patent is extended or adjusted under 35 U.S.C. 154(b) by 202 days.

(21) Appl. No.: 15/199,039

(22) Filed: Jun. 30, 2016

(65) Prior Publication Data

US 2018/0005246 A1    Jan. 4, 2018

(51) Int. Cl.
| | |
|---|---|
| *G06F 11/00* | (2006.01) |
| *G06Q 30/00* | (2012.01) |
| *G06F 11/07* | (2006.01) |
| *H04L 12/24* | (2006.01) |
| *H04L 29/06* | (2006.01) |

(52) U.S. Cl.
CPC ....... *G06Q 30/016* (2013.01); *G06F 11/0709* (2013.01); *G06F 11/0751* (2013.01); *G06F 11/0772* (2013.01); *H04L 41/0631* (2013.01); *H04L 41/5074* (2013.01); *H04L 65/1063* (2013.01); *H04L 67/42* (2013.01)

(58) Field of Classification Search
CPC .................................................. G06F 11/0709
USPC ....... 714/37, 38.1, 38.11, 38.12, 38.13, 47.1, 714/46, 45, 48
See application file for complete search history.

(56) References Cited

U.S. PATENT DOCUMENTS

| | | |
|---|---|---|
| 7,673,036 B1 | 3/2010 | Tolbert, Jr. |
| 8,112,747 B2 | 2/2012 | Haeberle et al. |
| 8,229,083 B2 | 7/2012 | Gilzean et al. |
| 8,949,669 B1 | 2/2015 | Khokhar et al. |
| 9,289,166 B2 | 3/2016 | Ito |

(Continued)

FOREIGN PATENT DOCUMENTS

| | | |
|---|---|---|
| WO | 2015/101143 A1 | 7/2015 |
| WO | 2018/006003 A1 | 1/2018 |

OTHER PUBLICATIONS

International Search Report received for PCT Patent Application No. PCT/US2017/040351, dated Sep. 14, 2017, 2 pages.

(Continued)

*Primary Examiner* — Dieu Minh T Le

(74) *Attorney, Agent, or Firm* — Schwegman Lundberg & Woessner, P.A.

(57) ABSTRACT

In various example embodiments, a system and method for a proactive customer support system are provided. In some example embodiments, outgoing communications from an application server to a client device are monitored for error messages, outgoing error messages are detected, an error type for an error message is determined, an issue ticket including the error message and the error type is generated, and instructions are transmitted that cause a customer service device to display the issue ticket. In some example embodiments, the system additionally assigns a priority score and ranks open error tickets based on their respective error messages. In some example embodiments, the system provides a help message to the client device based on the error message, receives an information request from the client device, determines a reply message based on the information request, and transmits instructions to the client device to display the reply message.

20 Claims, 11 Drawing Sheets

(56) References Cited

U.S. PATENT DOCUMENTS

| | | | |
|---|---|---|---|
| 2002/0116484 A1* | 8/2002 | Podracky | H04L 41/069 709/223 |
| 2004/0117383 A1* | 6/2004 | Lee | G06F 17/30286 |
| 2004/0216108 A1 | 10/2004 | Robbin | |
| 2006/0026467 A1 | 2/2006 | Nehab et al. | |
| 2008/0208610 A1 | 8/2008 | Thomas et al. | |
| 2009/0193430 A1* | 7/2009 | Chao | G06Q 10/10 719/313 |
| 2015/0347751 A1* | 12/2015 | Card | H04L 63/20 726/23 |
| 2016/0100057 A1 | 4/2016 | Perez | |
| 2017/0019291 A1* | 1/2017 | Tapia | H04L 41/0631 |

OTHER PUBLICATIONS

International Written Opinion received for PCT Patent Application No. PCT/US2017/040351, dated Sep. 14, 2017, 6 pages.

* cited by examiner

INTERACTIVE ERROR USER INTERFACE

TECHNICAL FIELD

Embodiments of the present disclosure relate generally to data access and retrieval, and more particularly, but not by way of limitation, to a special-purpose machines that provide a proactive customer support system.

BACKGROUND

Conventionally, customer support is handled by providing a user with contact information for a customer support center or a customer support representative. When an error occurs, these conventional embodiments may prompt the user to contact a customer support operator or service directly and describe the error or issue.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, a proactive customer support system provides functionality to automatically collect and transmit data about an error message to a customer service operator and engage the user that has received the error message with customer service feedback based on the error message. This includes, for example, monitoring outgoing communications from an application server to the client device, detecting an outgoing error message, determining an error type for the error message, generating an issue ticket for the error message, and transmitting instructions to display the issue ticket on a customer support computer system. In some example embodiments, the proactive customer support system includes assigning priority scores to an open error ticket within a plurality of open error tickets, ranking issue tickets within the plurality based on priority score, and transmitting instructions to display the issue tickets on the customer service support system in an order based on the ranking. In some example embodiments, the priority score is determined based on the value of the transaction associated with the error ticket and historic data about a customer interacting with a client application on the client device. In some example embodiments, the proactive customer support system includes determining a help message to send to the user based on the error message, generating a help window that includes the help message, and transmitting instructions to display the help window on the client device. In some example embodiments, the proactive customer support system includes receiving an information request from the user regarding the error message, determining a reply message to send to the user based on the information request, and transmitting instructions to display the reply message on the client device.

Figure 1:
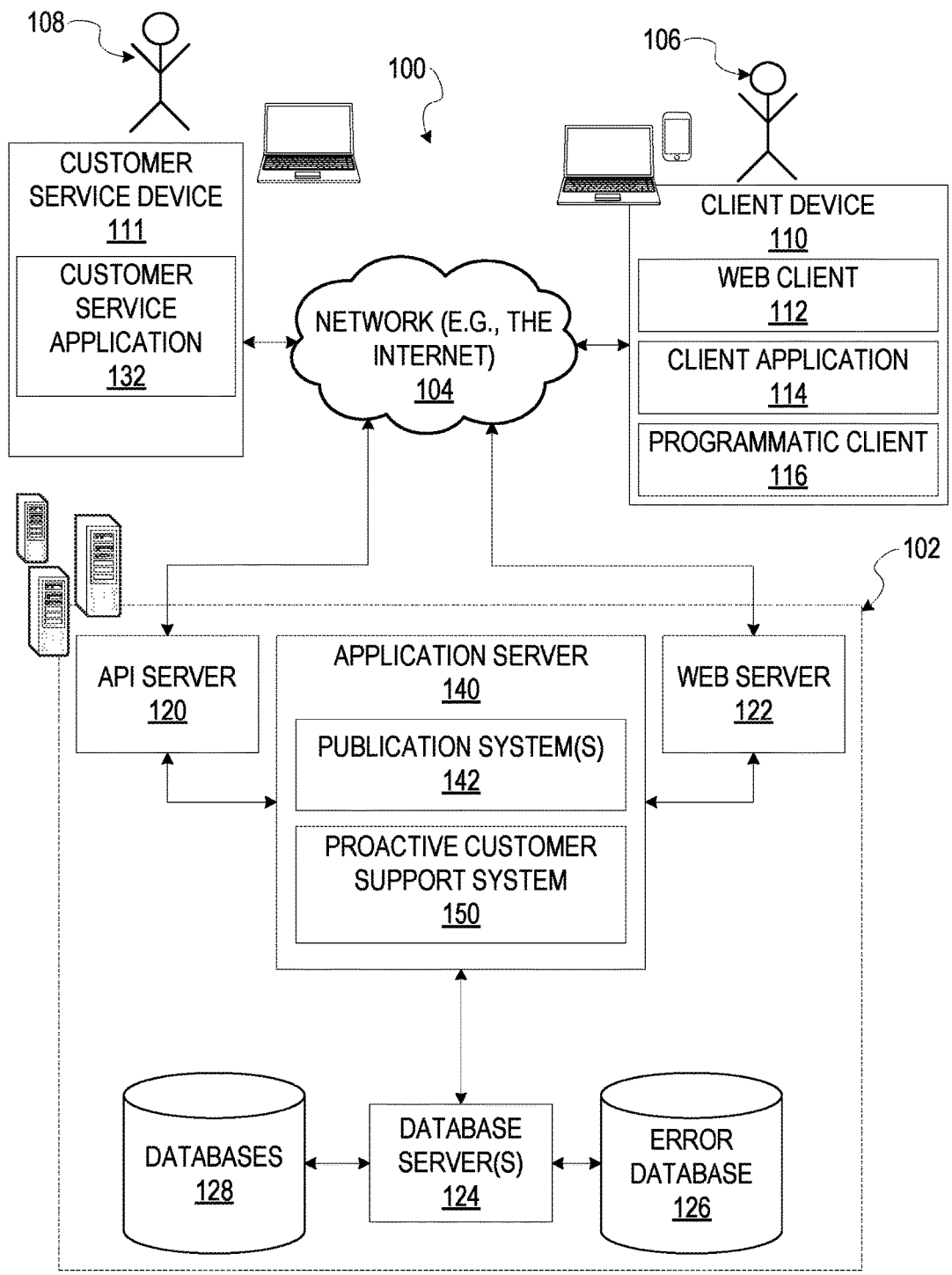
FIG. 1 is a block diagram illustrating a networked system, according to some example embodiments.

With reference to FIG. 1, an example embodiment of a high-level client-server-based network architecture 100 is shown. A networked system 102, in the example forms of a network-based system, provides server-side functionality via a network 104 (e.g., the Internet or wide area network (WAN)) to one or more client devices 110. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched. Telephone Network (PSTN), a cellular telephone network, a wireless network, a WiFi network, a WiMax network, another type of network, or a combination of two or more such networks.

FIG. 1 illustrates, for example, a web client 112 (e.g., a browser, such as the Internet Explorer® browser developed by Microsoft® Corporation of Redmond, Wash. State), a client application 114, and a programmatic client 116 executing on a client device 110. The client device 110 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 comprises a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user that is used to perform a operations involving digital content within the networked system 102.

The client device 110 may include one or more client applications 114 (also referred to as "apps") such as, but not limited to, a web browser, messaging application, electronic mail (email) application, an e-commerce site application (also referred to as a marketplace application), and the like. In some embodiments, if the e-commerce site application is included in the client device 110, then this application is configured to locally provide the user interface and at least some of the functionalities with the application configured to communicate with the networked system 102, on an as needed basis, for data or processing capabilities not locally available (e.g., access to a database of items available for sale, to authenticate a user, to verify a method of payment, etc.). Conversely if the e-commerce site application is not included in the client device 110, the client device 110 may use its web browser to access the e-commerce site (or a variant thereof) hosted on the networked system 102.

Similarly, a customer service device 111 may include one or more applications similar to applications included in the client device 110. Additionally, the customer service device 111 includes a customer service application 132 and other applications not included in the client device 110.

One or more users 106 may be a person, a machine, or other means of interacting with the client device 110. In example embodiments, the user 106 is not part of the network architecture 100, but may interact with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

In a similar manner, one or more operators 108 may be present in the system and may be a person, a machine, or other means of interacting with the customer service device 111. The operator 108 can further interact with the network architecture 100 to a similar extent as the user 106.

An application program interface (API) server 120 and a web server 122 are coupled to, and provide programmatic and web interfaces respectively to, one or more application servers 140. The application servers 140 may host one or more publication systems 142, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) including error database 126 and databases 128. In an example embodiment, the databases 128 are storage devices that store information such as a plurality of error types within an error table, and a plurality of reply messages. The databases 128 may also store digital item information in accordance with example embodiments.

The web client 112 accesses the publication system 142 via the web interface supported by the web server 122. Similarly, the programmatic client 116 accesses the various services and functions provided by the publication system 142 via the programmatic interface provided by the API server 120.

Additionally, a customer service application 132, executing on customer service device 111, is shown as having programmatic access to the networked system 102 via the programmatic interface provided by the API server 120. For example, the customer service application 132, utilizing information retrieved from the networked system 102, supports access by the operator 108 to the networked system 102. In this way the operator 108, can receive and transmit messages over the networked system 102 using the customer service device. Additionally, the operator 108 can receive contact information for the user 106 from the customer service device 111 and can further use the information to send messages or service calls to the client device 110.

The publication system(s) 142 may provide a number of publication functions and services to users 106 that access the networked system 102

The proactive customer support system 150 provides functionality to monitor outgoing communications from the application server 140 to the client device 110, detect an error message, retrieve an error type for the error message, generate an issue ticket, and transmit instructions to display the issue ticket on the customer service device 111. For example, the proactive customer support system 150 may detect an outgoing error message to the client device 110, access data from the error database 126 or databases 128 to retrieve an error type based on the error message by matching an error message identifier within metadata of the error message with an error type identifier within the metadata of an error type, generate an issue ticket including the error message in error type, and transmit instructions to display the issue ticket on the customer service device 111. In some example embodiments, the proactive customer support system 150 may provide further functionality to prioritize and rank open error tickets of a plurality of error tickets, to receive an information request from the user 106, and to determine a reply message to send to the client device 110. The proactive customer support system 150 will be discussed in more detail in connection with FIG. 2.

Further, while the client-server-based network architecture 100 shown in FIG. 1 employs a client-server architecture, the present inventive subject matter is of course not limited to such an architecture, and could equally well find application in a distributed or peer-to-peer, architecture system, for example.

Figure 2:
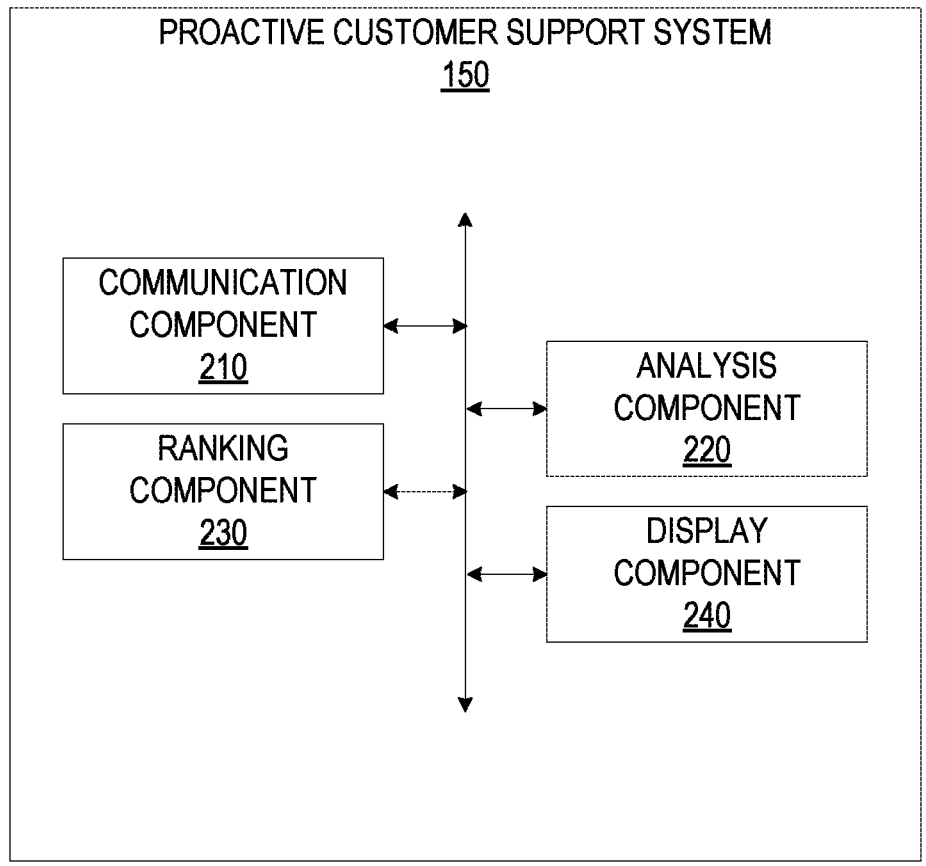
FIG. 2 is a block diagram that illustrates structural components of the proactive customer support system, according to some example embodiments.

FIG. 2 is a block diagram 200 of the proactive customer support system 150 according to example embodiments. The proactive customer support system 150 comprises a communication component 210, an analysis component 220, a ranking component 230, and a display component 240. All, or some, of the components 210-240 communicate with each other, for example, via a network coupling, shared memory, and the like. Each component can be implemented as a single component, combined into other components, or further subdivided into multiple components. Other components not pertinent to example embodiments can also be included, but are not shown. In some embodiments, the components 210-240 may be modules or engines.

The communication component 210 provides various monitoring and communications functionality. In example embodiments, the communication component 210 monitors outgoing communications from the application server 140 to the client device 110 over the network 104. For example, the communication component 210 detects when an outgoing communication includes an error message. As such, the communication component 210 proactively detects the error without the user having to report the error. In another example, the communication component 210 receives communications from the client device 110, such as an information request inputted by the user 106 that requests information about status of the client application 114. Further functionality of the communication component 210 is discussed in FIGS. 3-6 below.

The analysis component 220 provides various database access and data retrieval functionality. In example embodiments, the analysis component 220 accesses information located on data structures such as the error database 126 and databases 128. In example embodiments, the analysis component 220 further retrieves data from the data structures, such as error types or help messages, based on identifiers within the messages. For example, the analysis component 220 can detect and retrieve an error type within an error table by matching an error message identifier correlated to an error message with an error type identifier correlated to an error type. Further functionality of the analysis component 220 is discussed in FIGS. 3-6 below.

The ranking component 230 provides functionality to determine a priority score for open error tickets of a plurality of open error tickets and rank the open error tickets based on the priority score. In example embodiments, the ranking component 230 determines the priority score of an open error ticket correlated to an error message based on error data included in the error type. For example, the ranking component 230 determines that the error ticket stemming from a "search result page load issue" error type has a low priority score because the error data indicates this is a non-critical stage of user browsing or checkout. In example embodiments, the ranking component 230 further ranks open error tickets of the plurality of open error tickets based on the priority score. For example, an error ticket with a priority score of 70 out of 100 is ranked by the ranking component 230 higher than an open error ticket with a priority score of 50 out of 100. Further functionality of the ranking component 230 is discussed in FIGS. 3-6 below.

The display component 240 provides various functionality to transmit instructions to cause displays on the client device 110 or the customer service device 111. In example embodiments, the display component 240 generates an error ticket based on an error message detected by the communication component 210 and the error type of the error message retrieved by the analysis component 220. The display component 240 further transmits instructions to display open error tickets on the customer service device 111 based on the rank of the open error tickets determined by the ranking component 230. Further functionality of the display component 240 is discussed in FIGS. 3-6 below.

Figure 3:
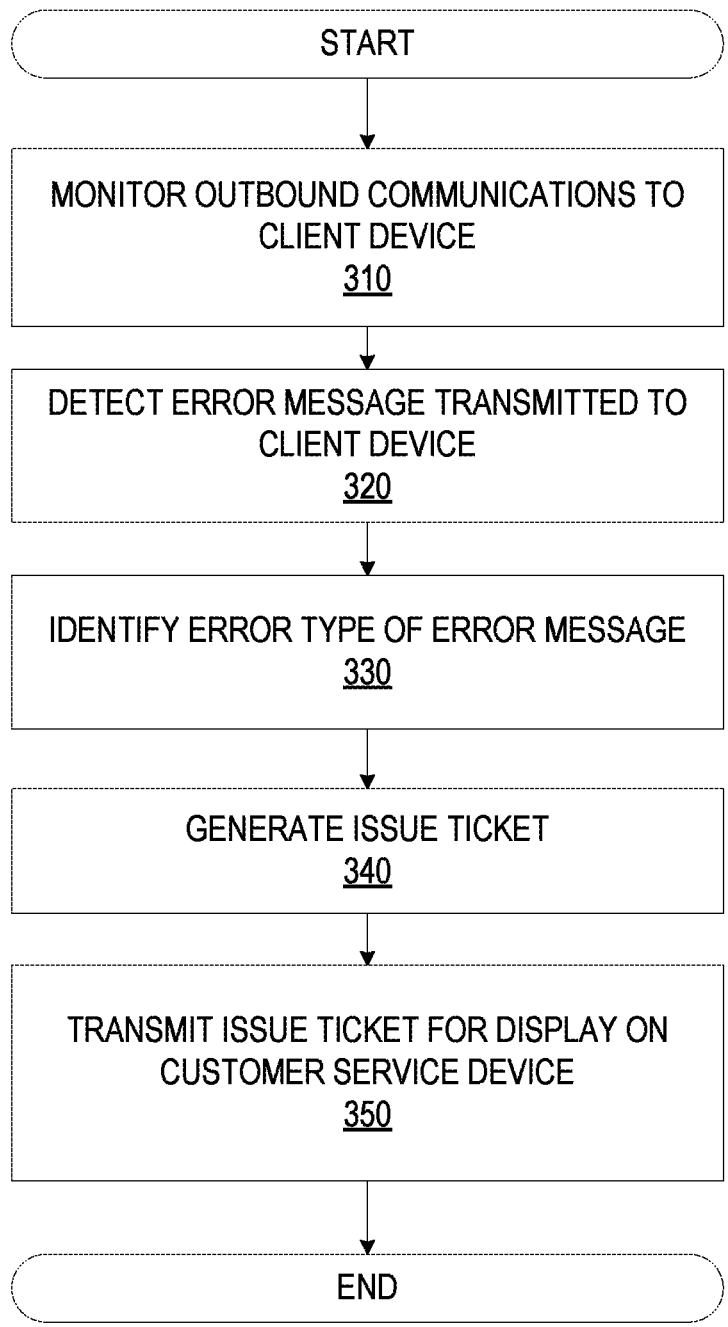
FIGS. 3-6 are flowcharts illustrating operations of the proactive customer support system in performing a method, according to some example embodiments.

FIGS. 3-6 are flowcharts illustrating operations of the proactive customer support system 150 in performing a method 300, according to some example embodiments. Operations in the method 300 may be performed by the proactive customer support system 150, using components (e.g., modules) described above with respect to FIG. 2, using one or more processors (e.g., microprocessors or other hardware processors), or using any suitable combination thereof. As shown in FIG. 3, the method 300 includes operations 310, 320, 330, 340, and 350.

At operation 310, the communication component 210 monitors communications traveling from the application server 140 the client device 110. In some example embodiments, the communications may be sent over the network 104 using a server such as the API server 120 or the web server 122. The communications may include information for the user 106 such as confirmation messages, status updates, or error messages.

At operation 320, the communication component 210 detects that an error message has been transmitted from the application server 140 to the client device 110. In some example embodiments, the communication component may detect the error message by detecting an error identifier in the metadata of the message. In example embodiments, the error message may include any messages that notify the user 106 of a non-processing event corresponding to a processing request.

At operation 330, the analysis component 220 determines the error type of the error message based on the error identifier within the error message. In some example embodiments, the error identifier is located in metadata within the error message. The analysis component 220 accesses the error identifier within the metadata and compares it to an error table located in the error database 126. In example embodiments, the error database 126 comprise a table of error identifiers that each correlate to an error type and an error type identifier. The analysis component 220 matches the error identifier with the error type identifier to determine the error type of the error message.

For example, the communication component 210 detects an outgoing error message that informs the user 106 about a failure to process a payment by detecting an error identifier in the metadata of the message. Additionally, the analysis component 220 determines that the error message informing the user 106 of the failure to process the payment correlates to a payment processing error type based on a look up of the error identifier in the error database 126. The analysis component 220 also correlates the error message to a processing message received by the application server 140 from the client device 110 that requested the processing of the payment. The analysis component 220 determines the correlation between the processing request and the error message by determining that the error identifier in the metadata of the error message matches a processing identifier in the metadata of the processing request. Thus, the analysis components 220 identifies the error message as a payment non-processing error type.

In some example embodiments, the error message contains other identifiers within the metadata and the analysis component 220 determines an error type based on these identifiers. For example, the error message may contain a currency system failure indicator within the metadata of the error message, and the analysis component 220 determines that the error type is a currency non-processing error type and is distinguished from a payment non-processing error type.

At operation 340, the display component 240 generates an issue ticket that includes the error message and the error type. In some example embodiments, the display component 240 additionally includes information about the user 106 in the issue ticket. Further, in this example embodiment, the display component 240 may include other data in the issue ticket such as a processing request transmitted from the client device 110 to the application server 140 over the network 104 that is correlated to the error message.

At operation 350, the display component 240 transmits the issue ticket to the customer service device 111 for display to the operator 108. In some example embodiments, the issue ticket is transmitted over the network 104 and viewable by the operator 108 on a user interface of the customer service device 111. In some embodiments, the issue ticket displayed on the user interface may include contact information for the operator 108 to contact the user 106. For example, the user interface may display a phone number or email address of the user 106.

Figure 4:
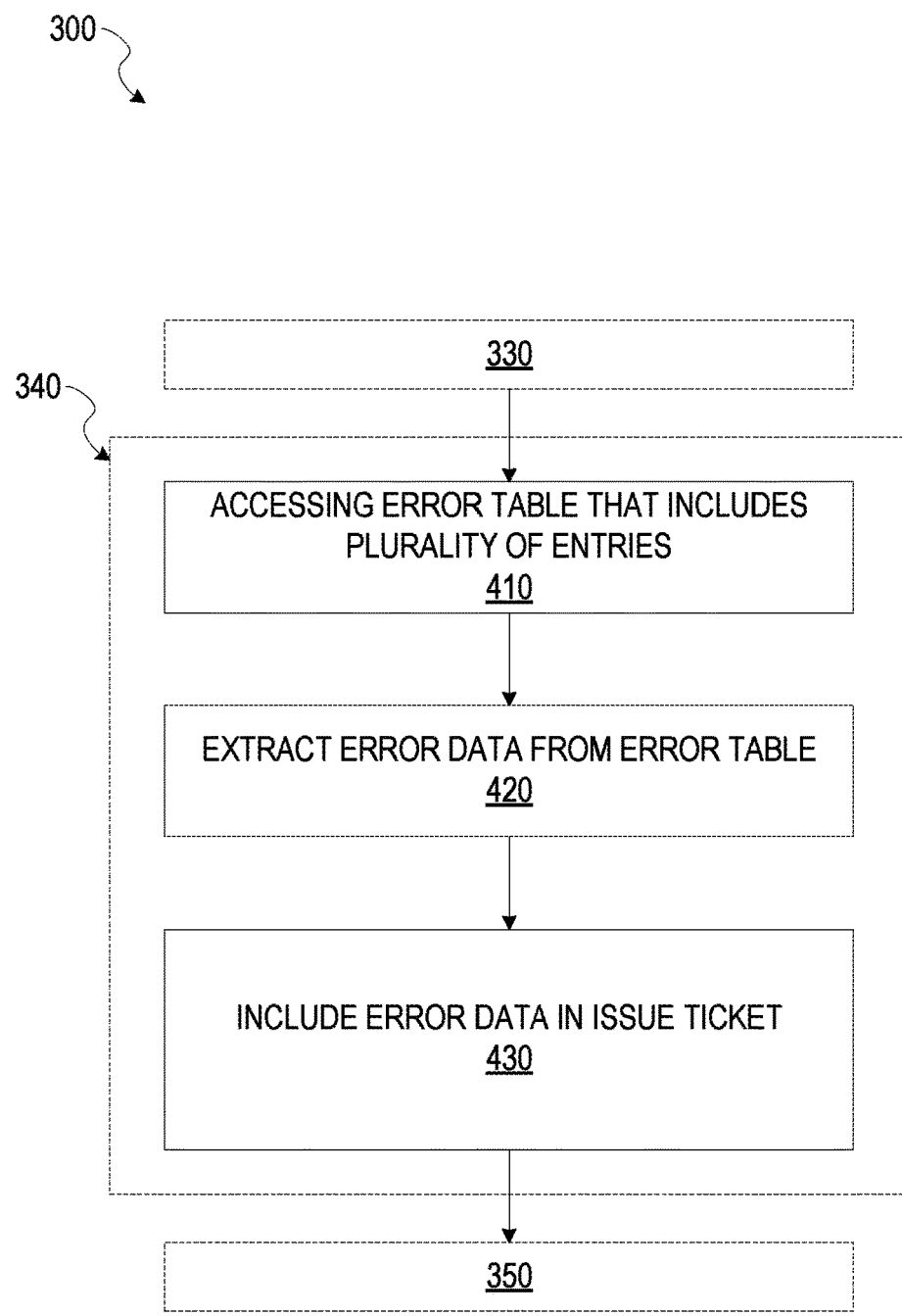

In some embodiments, the method 300 includes further sub operations for operation 340, such as operations 410-430 illustrated in FIG. 4, in which the display component 240 generates the issue ticket. The method 300 can include a single instance of, or a combination of, operations 410-430.

At operation 410, the analysis component 220 accesses an error table that includes a plurality of error entries. In some example embodiments, the error table is located on the error database 126, which accessible using a database server 124. In some example embodiments, the error table is located on a memory within the application server 140 or on a third-party database.

At operation 420, the analysis component 220 extracts error data from the error table that is associated with the error type detected for the error message. In some example embodiments, the error data includes a history of the error type, a severity of the error type, and a processing time. In an example, the analysis component 220 determines that the error message is associated with an incorrect billing zip code error type based on the error message identifier and extracts error data related to the incorrect billing zip code error type. The error data includes, in this example, an indication of medium severity because an incorrect zip code stops the transaction at a point when it is about to be completed. The error data further includes an indication of a low processing time because it will likely take the operator 108 a very short amount of time to prompt the user 106 for a solution (e.g., a correct zip code). Other error data may also be included in the error table that may or may not be extracted by the analysis component 220.

At operation 430, the display component 240 includes error data extracted from the error table by the analysis component 220 in the issue ticket. In some example embodiments, the display component 240 generates the issue ticket and includes the error data extracted by the analysis component 220.

Figure 5:
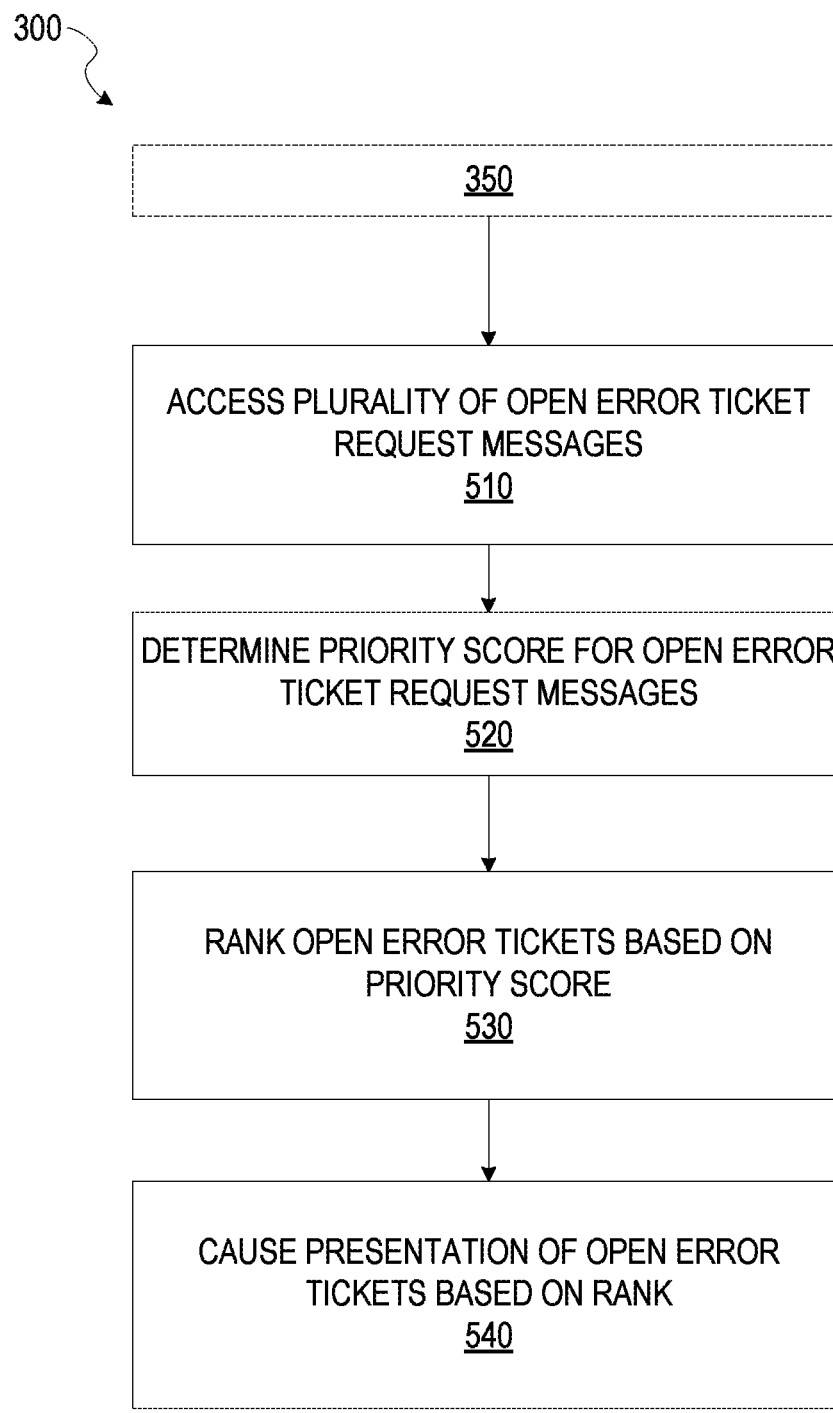

In some example embodiments, as shown in FIG. 5, operations 510-540 may be performed subsequently to or as part of (e.g., a precursor task, a subroutine, or a portion) operation 350 of the method 300, in which the display component 240 transmits the issue ticket for display on the customer service device 111.

At operation 510, the communication component 210 accesses a plurality of open error ticket requests messages that are assigned to a particular customer service device 111. The open error tickets are correlated to outgoing messages to a plurality of client devices and users, including client device 110 and user 106. The open error ticket requests messages are "open" as in the issues have not yet been resolved by the operator 108. In some example embodiments, the open error tickets are located in a data structure such as databases 128. The open error tickets could further be organized into a ticket table within the databases 128.

At operation 520, the ranking component 230 determines a priority score for each open error ticket. In some example embodiments, the priority score is based on error data included in each of the open error tickets. For example, if the error data indicates that the error has occurred in a critical stage of checkout (e.g., the user has submitted a payment request), the open error ticket is assigned a high priority score (e.g., 70 out of 100). If, on the other hand, the error data for the error type indicates the error occurred while the user is searching for products which is not considered a critical stage, the open error ticket is assigned a low priority score (e.g., 30 out of 100). In some example embodiments, rules for determining a score are located in a scoring table on one of the databases 128 and accessible by the ranking component 230.

In some example embodiments, the ranking component 230 factors the time elapsed since the transmission of the error message to the client device in determining the priority score of the open error ticket requests. For example, an open error ticket request correlating to an error message transmitted to the client device 110 that is originally assigned a priority score of 30 out of 100 may be increased to 40 out of 100 if it is unresolved five minutes after the transmission, and score of 50 out of 100 if it is unresolved 10 minutes after the transmission. In this example, the rule for adding 10 to the score of the open error ticket every 10 minutes is located on the on the scoring table in one of the databases 128 and is accessed by the ranking component 230.

In some example embodiments, the ranking component 230 also factors in user data in determining the priority score of the open error tickets. For example, the ranking component 230 accesses user data from a data structure, such as databases 128, that indicates that the client device 110 is correlated with a new user account (e.g., a user account that has been open for less than a week or has processed less than five transactions). In this example, the ranking component 230 assigns the open error tickets a score of 80 out of 100 regardless of the error type of the correlated error message, the time elapsed since transmission of the correlated error message, or other factors.

At operation 530, the ranking component 230 ranks the open error tickets based on the priority scores. For example, a first open error ticket with a priority score of 90 out of 100 would be ranked ahead of a second open error ticket with a priority score of 40 out of 100.

At operation 540, the display component 240 causes presentation of the open error tickets based on the rank (e.g., on the customer service device 111). Continuing the example above, the display component 240 then transmits instructions to the customer service device 111 to display the first open error ticket above the second open error ticket. This ranking by the ranking component 230 and display of instructions by the display component 240 can continue as new open error tickets correlated with error messages are added.

Figure 6:
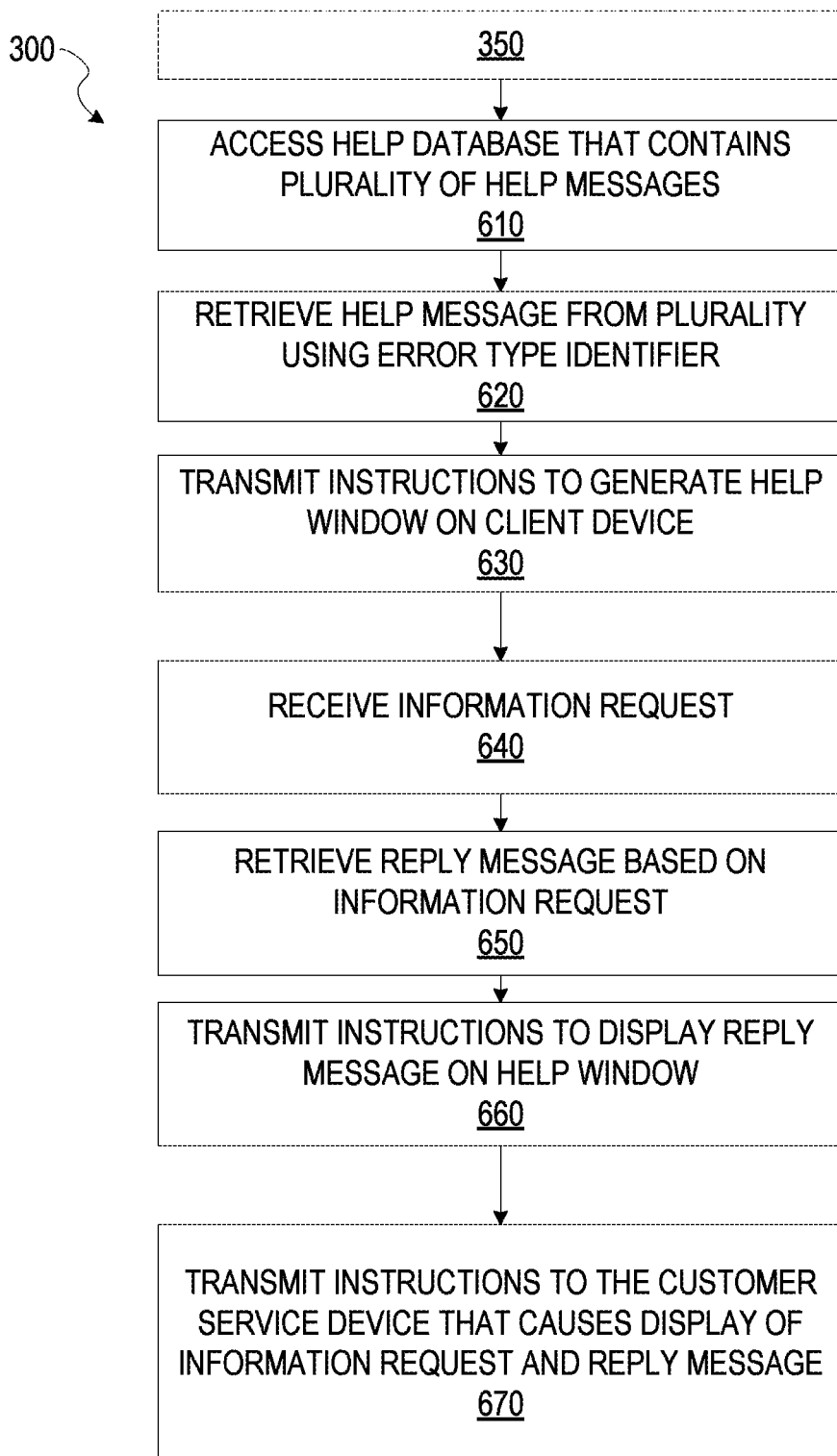

In some example embodiments, as shown in FIG. 6, operations 610-670 included in the method 300 may be performed subsequently to or as part of (e.g., a precursor task, a subroutine, or a portion) operation 350 of method 300, in which the display component 240 transmits the issue ticket for display on the customer service device 111.

At operations 610, the analysis component 220 accesses a plurality of help messages within a help database. The analysis component 220 retrieves a help message from the plurality help messages based on the error type identifier of the error message in operation 620. Subsequently in operation 630, the display component 240 transmits instructions to the client device 110 to generate a help window viewable on the client device 110 that includes the help message. In some example embodiments, the help database is located in the databases 128 and comprises a table containing help messages correlated to error type identifiers. In some example embodiments, the analysis component 220 retrieves the help message using the error type identifier by matching the error type identifier with a help message identifier located within the metadata of the help message. In some embodiments, the display component 240 generates the help window that includes the help message and transmits the help window for display on the client device 110. In some example embodiments, the help window may include a chat feature that allows the user 106 to input an information request or other user message.

For example, after the display component 240 transmits the error ticket for an incorrect payment zip code to the customer service device 111, the analysis component 220 accesses the help database containing a plurality of help messages. The analysis component 220 then compares the error type identifier of the incorrect zip code error type with a help message identifier within the help database. The display component 240 then generates a help window and includes the help message in the help window, whereby the help message may read "There was an issue processing your payment, a customer service representative will contact you shortly." The display component 240 further transmits the help window to the client device 110, and the help message is viewable on a user interface within the client application 114. The help window further includes a chat that allows the user to submit a textual information request. In some example embodiments, the help window also includes a link to a help resource. The link further may be determined by the analysis component 220 based on the error type identifier (e.g., a shipping method error causes a prompt to display a link for a wiki on appropriate shipping methods).

At operations 640, the communication component 210 receives an information request from the client device 110. The analysis component 220, responsive to the communication component 210 receiving the information request, retrieves a reply message based on the information request in operation 650.

In operation 660, the display component 240, responsive to the analysis component 220 receiving the reply message, transmits instructions to the client device 110 to display the reply message on the help window. In some example embodiments, the analysis component 220 employs one or more semantic algorithms to determine the appropriate reply message and retrieves the message from a reply database such as databases 128. For example, the analysis component 220 detects the phrase "how long" within the information request. The analysis component 220 then retrieves a reply message having a reply identifier correlated to the phrase "how long" and also correlated to the error type identifier of the error message. In this example, the reply message reads, "The technician is currently working to resolve your payment processing issue, issues like this are typically resolved within five minutes." The display component 240 transmits instructions to the client device 110 that cause the client device 110 to display the reply message within the help window.

At operation 670, the display component 240 transmits instructions to the customer service device 111 that cause the display of the information request received by the communication component 210 and the reply message. The display is viewable on a user interface by the operator 108. In an example, the issue ticket that is associated with the error message and that is displayed on the customer service device 111 includes a record of the information request received from the client device 110 and the reply message transmitted to the client device 110.

Figure 7:
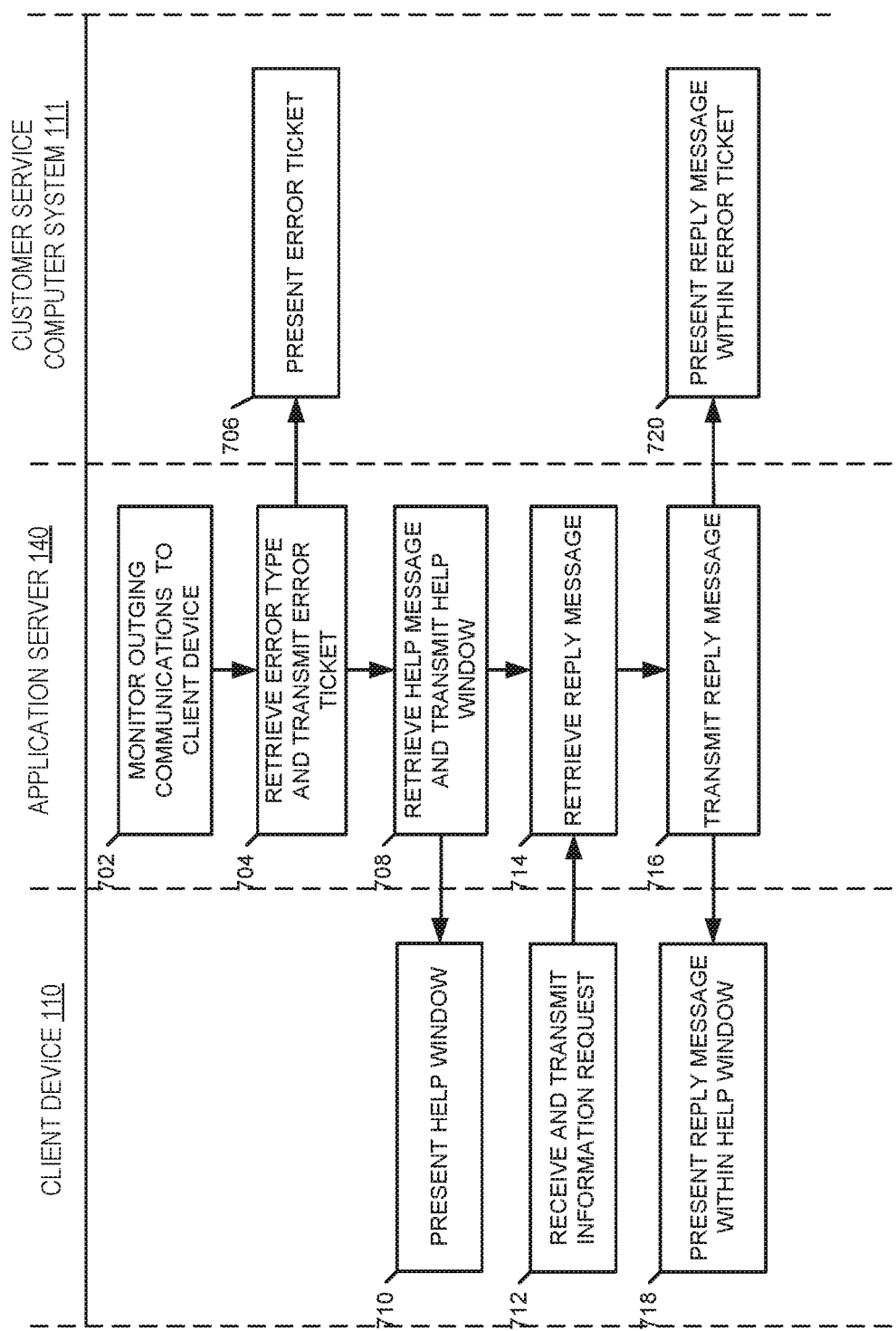
FIG. 7 is an interaction diagram showing the interactions between components of the proactive customer support system, according to some example embodiments.

FIG. 7 is an interaction diagram further showing an example of the specific interactions involved in operations 310-350 and 610-670 as applied to the system of FIGS. 3 and 6. Specifically, the diagram shows the interaction between the application server 140, the client device 110, and the customer service device 111.

At 702, the communication component 210 located on the proactive customer support system 150 within the application server 140 monitors outgoing communications to the client device 110. At 704, once the communication component 210 detects an outgoing error message, the analysis component 220 retrieves an error type from the error database 126 based on the error message. The display component 240 then generates an error ticket and transmits instructions to display the error ticket on the customer service device 111.

At 706, customer service device 111 receives the error ticket and instructions to present the error ticket from the application server 140. The customer service device 111 causes a display viewable on a user interface of the customer service device 111.

At 708, the analysis component 220 retrieves a help message from a help database, such as databases 128. The display component 240 generates a help window that includes the help message and transmits instructions to the client device 110 to display the help window.

At 710, the client device 110 receives the help window and instructions to display the help window from the application server 140 and causes a display of the help window viewable on a user interface of the client device 110. At 712, the client device 110 receives an information request from the user 106 via a user input (e.g., the user typing the question into a messaging field on the help window) and transmits the information request to the application server 140.

At 714, responsive to receiving the information request, the analysis component 220 retrieves the reply message based on the information request and the error type of the error message. At operation 716, the display component 240 transmits, to client device 110, the reply message and instructions to present the reply message within the help window. The display component 240 also transmits the reply message and instructions to present the reply message within a user interface displaying the error ticket to the customer service device 111.

At 718, client device 110 causes presentation of the reply message within the help window on the user interface of the client device 110. At 720, customer service device 111 causes presentation of the reply message within the user interface displaying the error ticket on the customer service device 111.

Figure 8:
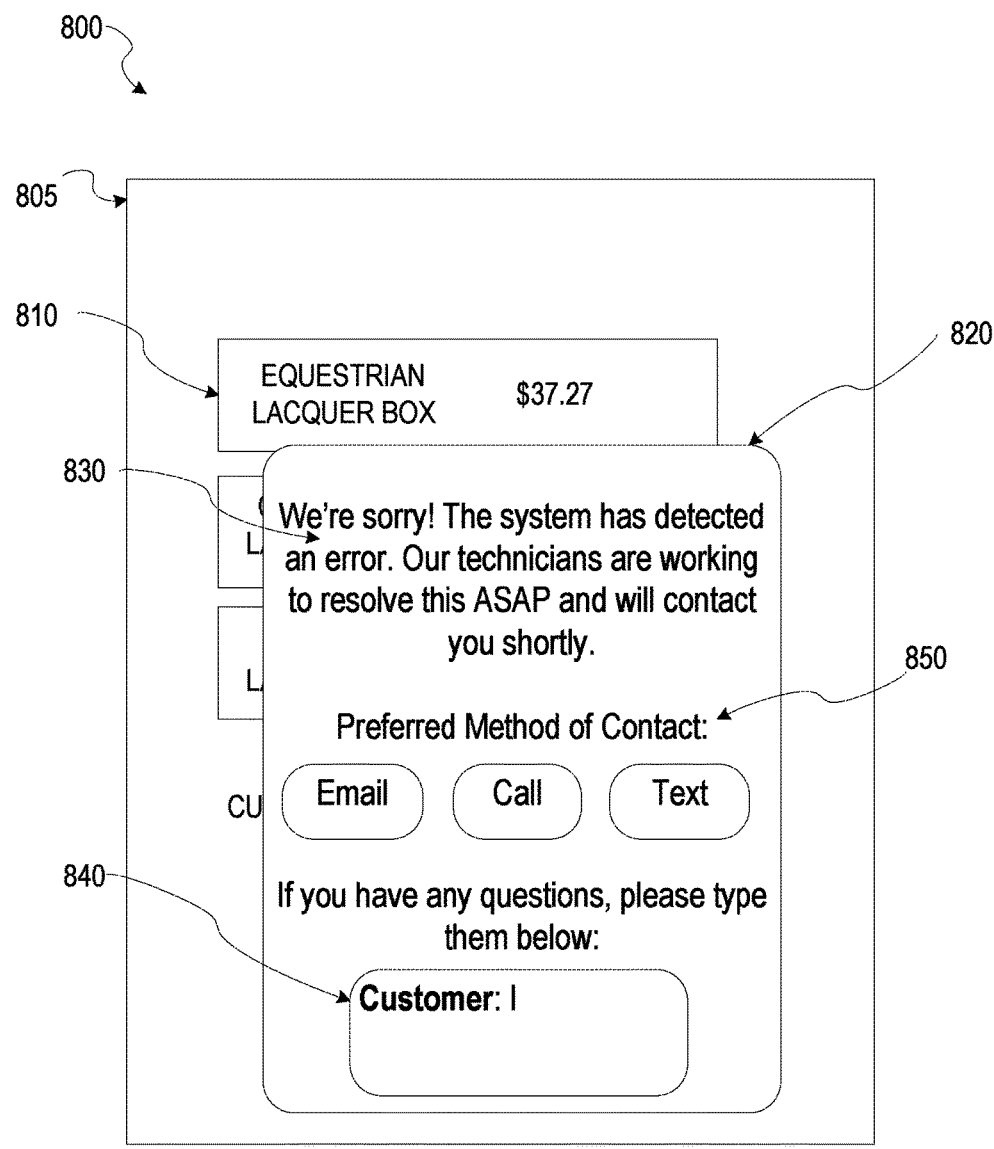
FIGS. 8-9 are interface diagrams that show a client application user interface on a client device that is viewable by a user.
Figure 9:
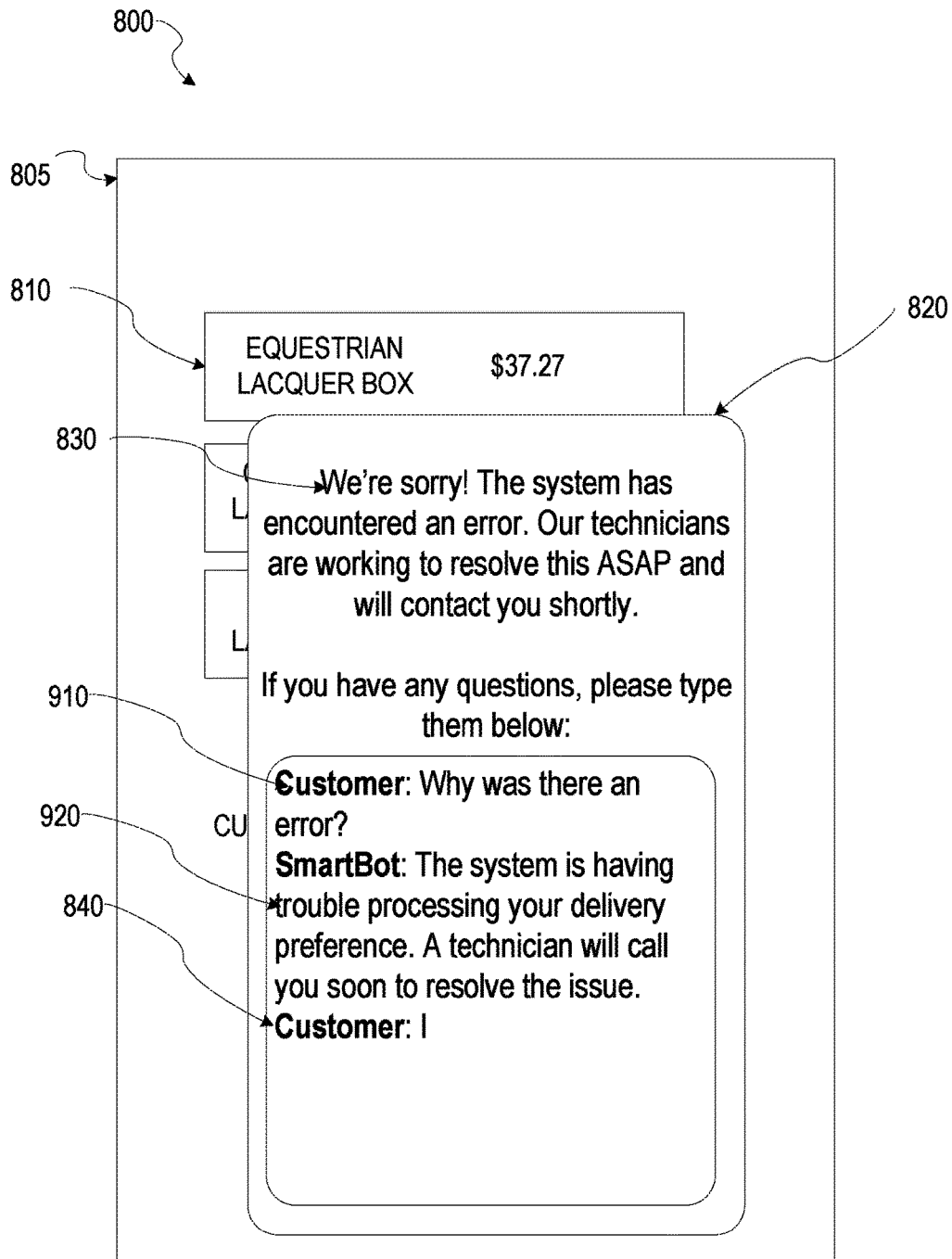

FIGS. 8-9 are interface diagrams that show a client application display 800 on the client device 110 that is viewable by the user 106. The display 800 includes a graphic user interface 805 that is viewable on the client device 110. In FIG. 8, the user 106 is in the process of ordering products on the client application 114. Included on the graphic user interface 805 is a representation of the products 810 including the "equestrian lacquer box" for $37.27. Also included is a help window 820 received from the application server 140. The help window 820 presents a help message 830 that indicates that the system has encountered an error and that a technician will contact the user 106 shortly. Also included in the help window 820 is an information request field 840 in which the user 106 can input a question or request for information about the error. In addition, a contact option 850 may be presented to the user, where the user 106 can select the form of contact that they would like the operator 108 to use.

In FIG. 9, when the user 106 types, or otherwise inputs, an information request or a question 910 in the information request field 840, the help window 820 further displays a help message 920 received from the proactive customer support system 150 on the application server 140.

Figure 10:
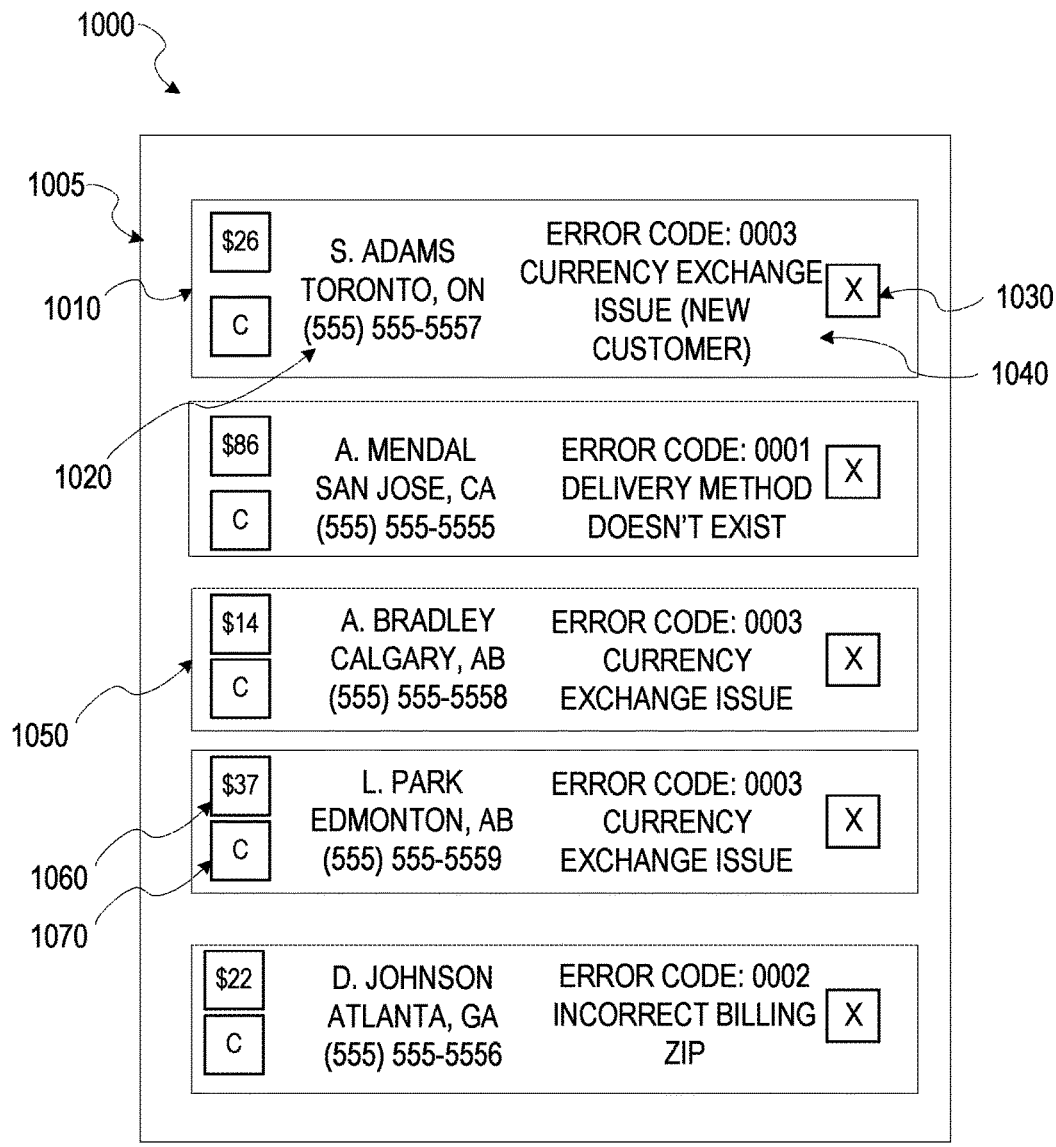
FIG. 10 is an interface diagram that shows a customer service application user interface on a customer service device that is viewable by an operator.

FIG. 10 is an interface diagram that shows a customer service display interface 1000 on the customer service device 111 that is viewable by the operator 108. The display interface 1000 includes a graphic user interface 1005 that is viewable on the customer service device 111. The graphic user interface 1005 includes several issue tickets that have been ranked by the ranking component 230 in order from highest ranking at the top to lowest ranking at the bottom. On the first ranked issue ticket 1010, user information 1020 is shown including a name, location, and phone number of a user. Additionally, an error type 1040 is shown along with an indication that the user correlated with the issue ticket is a new customer. In some example embodiments, there may be further information presented to the operator, such as a transaction value 1060 that displays the value of a transaction that an issue ticket relates to, and a phase indicator 1070 that indicates the related phase of the error ticket (e.g., whether the error occurred during checkout, as indicated by a "C" or during shopping, as indicated by an "S"). The five error tickets displayed have various values, as indicated by the transaction value 1060, but all relate to errors occurring during checkout, as indicated by the phase indicator 1070. In some example embodiments, an issue ticket that is particularly critical (e.g., the transaction value is greater than $1000) the issue ticket may contain an additional notification to the operator 108 that the operator should call the user 106 immediately to increase the likelihood of resolving the transaction.

In this example, although the first ranked issue ticket 1010 is associated with the same error type as the third ranked issue ticket 1050, the first ranked issue ticket 1010 is ranked ahead of the third ranked issue ticket 1050 because the user associated with the first ranked issue ticket 1010 is a new customer. Additionally, there is an option 1030 for the operator 108 to dismiss the ticket.

Modules, Components, and Logic

Certain embodiments are described herein as including logic or a number of components, modules, or mechanisms, Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The components, devices, methods, applications, and so forth described in conjunction with FIGS. 1-10 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here as those of skill in the art can readily understand how to implement the embodiments of the invention in different contexts from the disclosure contained herein.

Example Machine Architecture and Machine-Readable Medium

Figure 11:
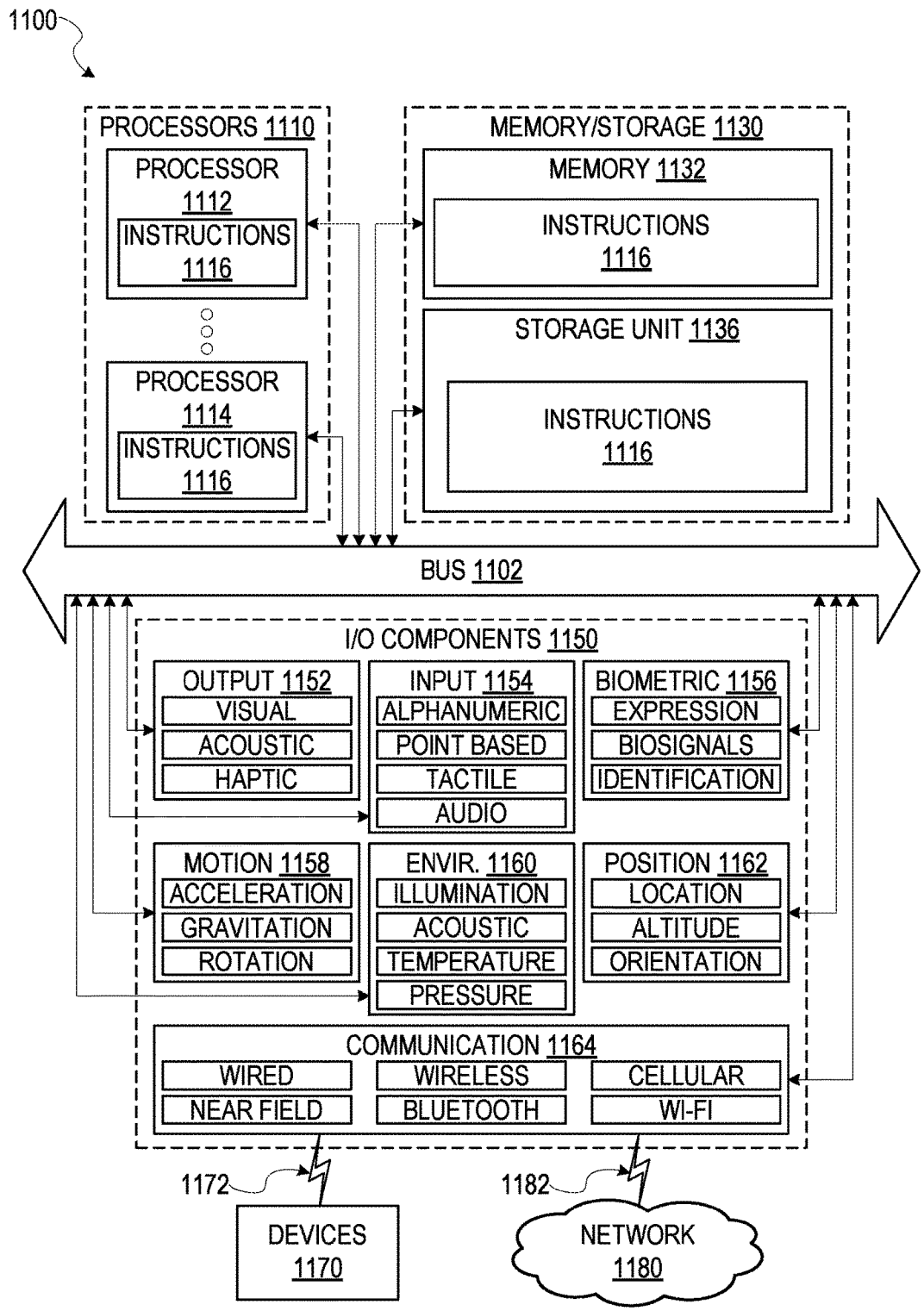
FIG. 11 illustrates a diagrammatic representation of a machine in the form of a computer system within which a set of instructions may be executed for causing the machine to perform any one or more of the methodologies discussed herein, according to an example embodiment.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example the instructions 1116 may cause the machine 1100 to execute the flow diagrams of FIGS. 3-6. Additionally, or alternatively, the instructions 1116 may implement components 210-240 of FIG. 2, and so forth. The instructions 1116 transform the general, non-programmed machine into a particular machine programmed to carry out the described and illustrated functions in the manner described. In alternative embodiments, the machine 1100 operates as a stand-alone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory 1130, and I/O components 1150, which may be configured to communicate with each other such as via a bus 1102. In an example embodiment, the processors 1110 (e.g., a Central Processing Unit (CPU), a Reduced instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1112 and processor 1114 that may execute instructions 1116. The term "processor" is intended to include multi-core processor that may comprise two or more independent processors (sometimes referred to as "cores") that may execute instructions 1116 contemporaneously. Although FIG. 11 shows multiple processors 1110, the machine 1100 may include a single processor with a single core, a single processor with multiple cores (e.g., a multi-core process), multiple processors with a single core, multiple processors with multiples cores, or any combination thereof.

The memory/storage 1130 may include a memory 1132, such as a main memory, or other memory storage, and a storage unit 1136, both accessible to the processors 1110 such as via the bus 1102. The storage unit 1136 and memory 1132 store the instructions 1116 embodying any one or more of the methodologies or functions described herein. The instructions 1116 may also reside, completely or partially, within the memory 1132, within the storage unit 1136, within at least one of the processors 1110 (e.g., within the processor's cache memory), or any suitable combination thereof, during execution thereof by the machine 1100. Accordingly, the memory 1132, the storage unit 1136, and the memory of processors 1110 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1150 may include a wide variety of components to receive input, provide output, produce output, transmit information, exchange information, capture measurements, and so on. The specific 110 components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162 among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via coupling 1182 and coupling 1172 respectively. For example, the communication components 1164 may include a network interface component or other suitable device to interface with the network 1180. In further examples, communication components 1164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a Universal Serial Bus (USB)).

Moreover, the communication components 1164 may detect identifiers or include components operable to detect identifiers. For example, the communication components 1164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geo-location, location via Wi-Fi® signal triangulation, location via detecting an NFC beacon signal that may indicate a particular location, and so forth.

Transmission Medium

In various example embodiments, one or more portions of the network 1180 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network and the coupling 1182 may be a Code Division Multiple Access (CDMA) connection, a Global System for Mobile communications (GSM) connection, or other type of cellular or wireless coupling. In this example, the coupling 1182 may implement any of a variety of types of data transfer technology, such as Single Carrier Radio Transmission Technology (1×RIT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to devices 1170. The term "transmission medium" shall be taken to include any intangible medium that is capable of storing, encoding, or carrying instructions 1116 for execution by the machine 1100, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure, Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   at least one processor of a machine; and
   a memory storing instructions that, when executed by the at least one processor, cause the machine to perform operations comprising:
   monitoring outbound communications transmitted from an application server to a client device to detect an error;
   based on the monitoring, detecting an error message in the outbound communications transmitted from the application server to the client device, the error message including an error message identifier;
   in response to detecting the error message, generating an error user interface comprising a bot based interactive chat window;
   causing display of the error user interface on the client device;
   receiving, from the client device, a textual status request input into the bot based interactive chat window on the client device; and
   causing display of a reply message in the bot based interactive chat window on the client device, the reply message being pre-associated with one or more terms in the textual status request.

2. The system of claim 1, wherein the operations further comprise:
   accessing an error table from a database, the error table including a plurality of entries, the plurality of entries corresponding to a plurality of error types, each entry including error data associated with a corresponding error type;
   extracting, from the error table, error data associated with an error type of the error message transmitted to the client device; and
   transmitting, to an additional client device, instructions to display the error data.

3. The system of claim 1, wherein the operations further comprise:
   accessing a plurality of open error messages transmitted to an additional client device;
   determining a priority score for each of the plurality of open error messages;
   ranking the plurality of open error messages based on respective priority scores of each open error message; and
   transmitting, to the additional client device, instructions to display the plurality open error messages in an order based on the ranking.

4. The system of claim 3, wherein determining the priority score for the plurality of open error messages is based on an error type of each of the plurality of open error messages.

5. The system of claim 3, wherein determining the priority score for each of the plurality of open error messages is further on an amount of time elapsed since each error message was transmitted to the client device.

6. The system of claim 3, wherein determining the priority score for each of the plurality of open error messages is based on user data.

7. The system of claim 1, wherein the error user interface further comprises a link to an information page based on an error type of the error message transmitted to the client device.

8. The system of claim 1, wherein the operations further comprise:
   transmitting instructions to an additional client device to include a display of the textual status request and the reply message pre-associated with one or more terms in the textual status request.

9. The system of claim 8, wherein the display of the textual status request and the reply message further comprises service call instructions.

10. A method comprising:
monitoring outbound communications transmitted from an application server to a client device to detect an error;
based on the monitoring, detecting an error message in the outbound communications transmitted from the application server to the client device, the error message including an error message identifier;
in response to detecting the error message, generating an error user interface comprising a bot based interactive chat window;
causing display of the error user interface on the client device;
receiving, from the client device, a textual status request input into the bot based interactive chat window on the client device; and
causing display of a reply message in the bot based interactive chat window on the client device, the reply message being pre-associated with one or more terms in the textual status request.

11. The method of claim 10, further comprising:
accessing an error table from a database, the error table including a plurality of entries, the plurality of entries corresponding to a plurality of error types, each entry including error data associated with a corresponding error type;
extracting, from the error table, error data associated with an error type of the error message transmitted to the client device; and
transmitting, to an additional client device, instructions to display the error data.

12. The method of claim 11, further comprising:
accessing a plurality of open error messages transmitted to an additional client device;
determining a priority score for each of the plurality of open error messages;
ranking the plurality of open error messages based on respective priority scores of each open error message; and
transmitting, to the additional client device, instructions to display the plurality open error messages in an order based on the ranking.

13. The method of claim 12, wherein determining the priority score for the plurality of open error messages is based on an error type of each of the plurality of open error messages.

14. The method of claim 12, wherein determining the priority score for each of the plurality of open error messages is further on an amount of time elapsed since each error message was transmitted to the client device.

15. The method of claim 12, wherein determining the priority score for each of the plurality of open error messages is based on user data.

16. The method of claim 10, wherein the error user interface further comprises a link to an information page based on an error type.

17. The method of claim 1, further comprising:
transmitting instructions to an additional client device to include a display of the textual status request and the reply message pre-associated with one or more terms in the textual status request.

18. The method of claim 17, wherein the display of the textual status request and the reply message further comprises service call instructions.

19. A non-transitory machine-readable storage medium comprising instructions that, when executed by one or more processors of a machine, cause the machine to perform operations comprising:
monitoring, using a processor, outbound communications transmitted from an application server to a client device;
detecting an error message in the outbound communications transmitted from the application server to the client device, the error message including an error message identifier;
in response to detecting the error message, generating an error user interface comprising a bot based interactive chat window;
causing display of the error user interface on the client device;
receiving, from the client device, a textual status request input into the bot based interactive chat window on the client device; and
causing display of a reply message in the bot based interactive chat window on the client device, the reply message being pre-associated with one or more terms in the textual status request.

20. The non-transitory machine-readable storage medium of claim 19, further comprising:
accessing an error table from a database, the error table including a plurality of entries, the plurality of entries corresponding to a plurality of error types, each entry including error data associated with a corresponding error type;
extracting, from the error table, error data associated with an error type of the error message transmitted to the client device; and
transmitting, to an additional client device, instructions to display the error data.

* * * * *

UNITED STATES PATENT AND TRADEMARK OFFICE
CERTIFICATE OF CORRECTION

PATENT NO. : 10,198,732 B2
APPLICATION NO. : 15/199039
DATED : February 5, 2019
INVENTOR(S) : Dileep Kumar Basam It is certified that error appears in the above-identified patent and that said Letters Patent is hereby corrected as shown below:

In the Claims

In Column 20, Line 7, in Claim 17, delete "claim 1," and insert -- claim 10, --, therefor.

Signed and Sealed this
Twentieth Day of October, 2020

Andrei Iancu
*Director of the United States Patent and Trademark Office*